US009836646B2

(12) United States Patent
Collet et al.

(10) Patent No.: US 9,836,646 B2
(45) Date of Patent: Dec. 5, 2017

(54) METHOD FOR IDENTIFYING A CHARACTER IN A DIGITAL IMAGE

(71) Applicant: I.R.I.S., Mont-Saint-Guibert (BE)

(72) Inventors: Frederic Collet, Etterbeek (BE); Jordi Hautot, Neupre (BE); Michel Dauw, Machelen (BE); Pierre De Muelenaere, Court-Saint-Etienne (BE)

(73) Assignee: I.R.I.S., Mont-Saint-Guibert (BE)

( * ) Notice: Subject to any disclaimer, the term of this patent is extended or adjusted under 35 U.S.C. 154(b) by 126 days.

(21) Appl. No.: 14/884,361

(22) Filed: Oct. 15, 2015

(65) Prior Publication Data

US 2017/0109573 A1 Apr. 20, 2017

(51) Int. Cl.
G06K 9/46 (2006.01)
G06K 9/00 (2006.01)
(Continued)

(52) U.S. Cl.
CPC ......... G06K 9/00422 (2013.01); G06K 9/344 (2013.01); G06K 9/348 (2013.01);
(Continued)

(58) Field of Classification Search
CPC ........... G06K 2209/01; G06K 9/00463; G06K 9/00483; G06K 9/46
(Continued)

(56) References Cited

U.S. PATENT DOCUMENTS 551,978 A 12/1895 Lyons
6,348,214 B1 * 2/2002 Onyuksel ............. A61K 9/1271
264/4.1

(Continued)

FOREIGN PATENT DOCUMENTS

WO 0237933 A2 5/2002

OTHER PUBLICATIONS

Fukushima T et al: "On-line writing-box-free recognition of handwritten japanese text considering character size variations", Proceedings / 15th International Conference on Pattern Recognition: Barcelona, Spain, Sep. 3-7, 2000; [Proceedings of the International Conference on Pattern Recognition. (ICPR)]. IEEE Computer Society, Los Alamitos, CA, vol. 2, (Sep. 3, 2000), pp. 359-363, XPO10533829, DOI: 10.1109 /ICPR.2000.906087. ISBN: 978-0-7695-0750-7—the whole document.

(Continued)

*Primary Examiner* — Yosef Kassa
(74) *Attorney, Agent, or Firm* — Jerold I. Schneider; Schneider Rothman Intellectual Property Law Group, PLLC

(57) ABSTRACT

The invention relates to a method for combining a first Optical Character Recognition (OCR) and a second OCR. The first OCR is run first on an image of string of characters. Its output (first identified characters, positions of the characters and likelihood parameters of the characters) is used to generate a first graph. Segmentation points related to the positions of the first identified characters are used as input by the second OCR performing a combined segmentation and classification on the image of string of characters. The output (second identified characters, positions of the characters and likelihood parameters of the characters) of the second OCR is used to update the first graph to generate a second graph that combines the output of the first OCR with the output of the second OCR. Decision models are then used to modify the weights of paths in the second graph to generate a third graph. A best path is determined on the third graph to obtain the identification of the characters present in the image of string of characters.

24 Claims, 5 Drawing Sheets

(51) Int. Cl.
 *G06K 9/62* (2006.01)
 *G06K 9/68* (2006.01)
 *G06K 9/34* (2006.01)
(52) U.S. Cl.
 CPC .......... *G06K 9/6277* (2013.01); *G06K 9/685* (2013.01); *G06K 9/6857* (2013.01); *G06K 2009/6864* (2013.01); *G06K 2209/01* (2013.01)
(58) Field of Classification Search
 USPC ....... 382/170, 171, 190, 200, 209, 224, 229, 382/278, 282; 358/1.11, 537, 538
 See application file for complete search history.

(56) References Cited

U.S. PATENT DOCUMENTS

| | | | | |
|---|---|---|---|---|
| 6,473,517 | B1 * | 10/2002 | Tyan | G06K 9/344 382/105 |
| 6,504,540 | B1 * | 1/2003 | Nakatsuka | G06K 9/00442 345/619 |
| 7,222,306 | B2 * | 5/2007 | Kaasila | G06F 3/0481 715/760 |
| 8,315,462 | B2 * | 11/2012 | Nakamura | G06K 9/3233 382/177 |
| 8,620,858 | B2 * | 12/2013 | Backholm | G06F 17/30575 707/609 |
| 2010/0310172 | A1 | 12/2010 | Natarajan et al. | |
| 2015/0063700 | A1 | 3/2015 | Soundararajan et al. | |
| 2015/0302598 | A1 | 10/2015 | Collet | |

OTHER PUBLICATIONS

R.G. Casey et al: "A survey of methods and strategies in character segmentation", IEEE Transactions on Pattern Analysis and Machine Intelligence. vol. 18, No. 7, Jul. 1, 1996, pp. 690-706, XPO55087686, ISSN: 0162-8828, DOI: 10.1109/34.50672 the whole document.

* cited by examiner

METHOD FOR IDENTIFYING A CHARACTER IN A DIGITAL IMAGE

TECHNICAL FIELD

The present invention relates to methods and programs for identifying characters in a digital image.

BACKGROUND ART

Optical Character Recognition (OCR) methods which convert text present in an image into machine-readable code are known.

U.S. Pat. No. 5,519,786 describes a method for implementing a weighted voting scheme for reading and accurately recognizing characters in a scanned image. A plurality of optical character recognition processors scan the image and read the same image characters. Each OCR processor outputs a reported character corresponding to each character read. For a particular character read, the characters reported by each OCR processor are grouped into a set of character candidates. For each character candidate, a weight is generated in accordance with a confusion matrix which stores probabilities of a particular OCR to identify characters accurately. The weights are then compared to determine which character candidate to output.

Such a method has several limitations. First, since OCR processors are run in parallel, a character that would not be recognized by any of the OCR processors taken independently cannot be recognized by the method as a whole.

Second, a preprocessor has to quantify the strengths and weaknesses of the OCR processors to generate the cells of the confusion matrix that contain probabilities that the character read by an OCR processor is the character reported by the OCR processor. This step can take time. Moreover, if this step is not well performed, for example because the training set used for it is not suitable for a given type of character, a probability can be low for a character that is actually well recognized and the OCR method may provide worse results than the OCR processors taken independently.

DISCLOSURE OF THE INVENTION

It is an aim of the present invention to provide an improved method for applying multiple character identification processes on a digital image to achieve better and/or faster identification results. This aim is achieved according to the invention with a method for selecting character candidates in a method for identifying characters in a digital image, the method comprising the steps of
  a) applying a first character identification process to determine first character candidates and a list of segmentation points of the first character candidates,
  b) generating a list of character widths corresponding to a segmentation point from the list of segmentation points,
  c) determining a portion of the digital image corresponding to the segmentation point and a character width from the list of character widths,
  d) applying a character classification method on the portion of the digital image to obtain an ID hypothesis of a character possibly present in the portion of the digital image and a likelihood parameter that relates to a likelihood that the ID hypothesis is correct, and
  e) selecting the ID hypothesis as a second character candidate in the digital image if the likelihood parameter fulfils a first predetermined criterion.

In the method according to the invention, the segmentation points determined from the first character identification process (first OCR) are used as input for a combined segmentation and classification process (which includes steps b, c, d and e), which is a second OCR. Therefore, the second OCR is able to perform a better segmentation than if it was running alone, without the input of the first OCR. This allows the second OCR to use segmentation points that it would not have determined alone, and thus to recognize some characters, for example Asian characters, which it would not have recognized alone. Moreover, the second OCR works faster with this input from the first OCR, since its initial estimation of the width of the following character is better than without this input.

In embodiments of the invention, the method further comprises a step f) of updating the list of segmentation points with a further segmentation point determined based on the portion of the digital image corresponding to the selected second character candidate. This further segmentation point is expected to be useful for the character following the character that has just been identified.

In an embodiment of the invention, step f) comprises
  checking whether the further segmentation point is already in the list of segmentation points, and
  adding the further segmentation point in the list of segmentation points if the further segmentation point is not already present in the list of segmentation point.

In an embodiment of the invention, at step b) the list of character widths is generated based on at least the list of segmentation points of the first character candidates. The list of character widths can therefore be generated quickly and reliably since its determination is based on data coming from the first OCR.

In an advantageous way, steps b, c, d and e are performed for each segmentation point of the list of segmentation points. T In an embodiment of the invention, steps c, d and e are repeated for another character width of the list of character widths if the likelihood parameter does not fulfil the first predetermined criterion. If the likelihood parameter does not fulfil the first predetermined criterion, it indicates that the ID hypothesis may not be correct. It is therefore worthwhile considering another portion of the digital image starting at the same segmentation point and which therefore covers at least partially the same connected components.

In an embodiment of the invention, steps c, d and e are repeated for another character width of the list of character widths if the likelihood parameter fulfils the first predetermined criterion and does not fulfil a second predetermined criterion.

In an embodiment of the invention, the method further comprises the steps of:
  generating a data structure from the first character candidates and their segmentation points, and
  updating the data structure with the selected second character candidate and a following segmentation point calculated from the character width of the selected second character candidate and the segmentation point used for determining the portion of the digital image corresponding to the selected second character candidate.

A first purpose of the data structure is to combine the results of the character classification method with the results of first character identification process.

In an embodiment of the invention, step a) comprises determining first likelihood parameters of the first character candidates providing an indication of the chance that the candidate character is correct, the data structure includes the first likelihood parameters of the first character candidates, and the method further comprises the steps of:

changing the scale of the first likelihood parameters of the first character candidates and/or the likelihood parameters of the second character candidates to make them comparable to each other, and updating the data structure with the likelihood parameters of the second character candidates.

The likelihood parameters increase the accuracy of the method.

Preferably, the data structure is a graph wherein segmentation points are represented by vertices and character candidates are represented by edges between vertices.

Advantageously, the method includes the step of applying a decision model method on the updated data structure. Decision models improves the accuracy of the method.

In an embodiment of the invention, the method further comprises the steps of determining a best path in the updated data structure, and selecting the character candidates corresponding to the edges in the best path as the characters in the digital image.

Like that, the first OCR, the second OCR and the decision models are all taken into account at once to determine the identification of the characters.

Preferably, the step of applying a decision model method comprises favouring character candidates which have the first likelihood parameters of first character candidates and the second likelihood parameters of second character candidates fulfilling a third predetermined criterion.

In an embodiment of the invention, the first character identification method provides first character candidates for characters of a first type, wherein the character classification method provides second character candidates for characters of a second type, and the decision model method comprises favouring character candidates of the first type if the character candidates are provided by the first character identification process and favouring character candidates of the second type if the character candidates are provided by the classification method.

In an embodiment of the invention, the first character identification process comprises a decision model method.

In an embodiment of the invention, the first character identification process provides positions of first character candidates and further comprises a step of determining the list of segmentation points of the first character candidates from the positions of first character candidates. If the segmentation points are not provided by the first character identification process, they can be determined from the positions of first character candidates by the combined segmentation and classification or by an independent step performed preferably between steps a) and b) and possibly between steps b) and c).

It is another aim of the present invention to provide a method for identifying characters in a digital image.

This aim is achieved according to the invention with a method comprising:

a) applying a first character identification method to determine first character candidates and first segmentation points corresponding to the first character candidates, b) generating a first graph based on the first character candidates and the first segmentation points, wherein the first segmentation points are represented by vertices and the first character candidates by edges, c) applying a second character identification method on at least part of the digital image to generate at least one second character candidate, d) updating the graph by adding the at least one second character candidate to the first graph, and e) selecting in the updated graph character candidates as the characters of the digital image.

In this method, the graph, when generated, includes as vertices the segmentation points from the first OCR and as edges the IDs from the first OCR. The graph is then updated with new vertices and new edges coming from the second OCR. During the selection of character candidates (step e)), all edges are considered and none of them is a priori discarded. There is no need to benchmark the OCRs against each other to determine their weaknesses since all IDs, coming from all OCRs, are considered, even if a decision rule favoring some edges according to some conditions might be introduced in the graph. There is no need of a structure like the confusion matrix either.

Preferably, the second character identification method generates at least one second segmentation point and the at least one second segmentation point is added to the graph at step d).

In an embodiment of the invention, the first character identification method provides first likelihood parameters providing a likelihood that the first character candidates are correct, the second character identification method provides second likelihood parameters providing a likelihood that the at least one second character candidate is correct, and the method further comprises the steps of:

changing the scale of the first likelihood parameters and/or the second likelihood parameters to make them comparable to each other, adding the first likelihood parameters in the first graph, and adding the second likelihood parameters in the updated graph.

Advantageously, the method comprises the step of applying a decision model method on the updated graph.

In an embodiment of the invention, the decision model method comprises a rule which favours character candidates which have the first likelihood parameter and the second likelihood parameters fulfilling a third predetermined criterion.

In embodiments of the invention, some of the first and second character candidates are characters of a first or second type, and the decision model method comprises a rule which favours character candidates corresponding to the first type of characters if these character candidates have been determined by the first character identification method and favours character candidates corresponding to the second type of characters if these character candidates have been determined by the second character identification method.

Preferably, the second character identification method uses as input, at step c), the first segmentation points from the first character identification method. With this method, the second character identification method is able to perform a better segmentation than if it was run alone.

It is another aim of the present invention to provide a computer program which applies better multiple character identification processes on a digital image to achieve better and/or faster identification results.

This aim is achieved according to the invention with a non-transitory computer readable medium storing a program causing a computer to execute a method for identifying characters in a digital image, the method comprising the steps of:

a) applying a first character identification process to determine first character candidates and a list of segmentation points of the first character candidates, b) generating a list of character widths corresponding to a segmentation point from the list of segmentation points, c) determining a portion of the digital image corresponding to the segmentation point provided by the position of an initial first character candidate and a character width from the list of character widths, d) applying a character classification method on the portion of the digital image to obtain an ID hypothesis of a character possibly present in the portion of the digital image and a likelihood parameter that relates to a likelihood that the ID hypothesis is correct, and e) selecting the ID hypothesis as a character in the digital image if the likelihood parameter fulfils a first predetermined criterion.

The method according to the invention is preferably designed to be run on a computer.

BRIEF DESCRIPTION OF THE DRAWINGS

The invention will be further elucidated by means of the following description and the appended figures.

FIG. 6, comprising

MODES FOR CARRYING OUT THE INVENTION

Figure 1:
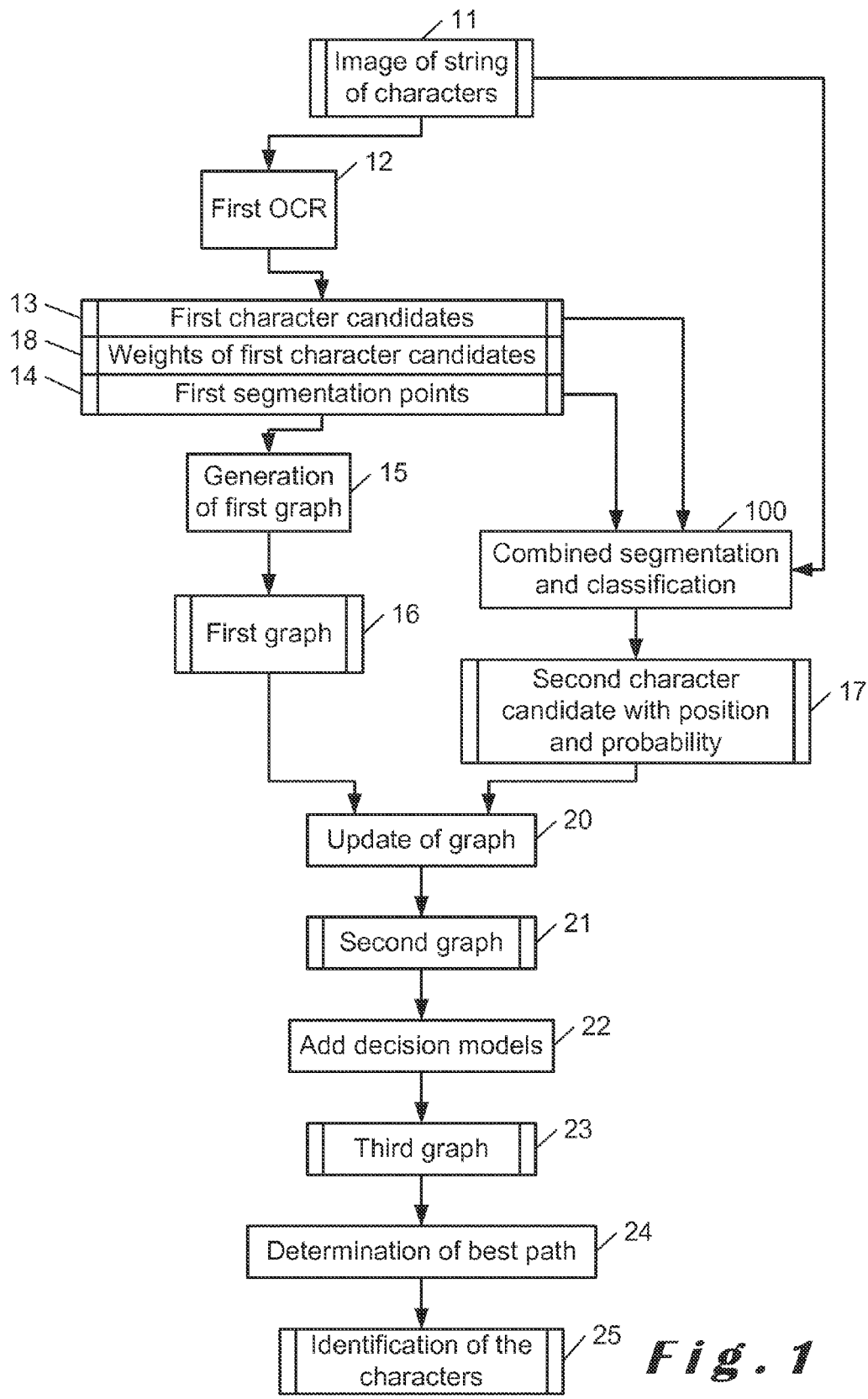
FIG. 1 illustrates a flowchart of an OCR method according to the invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

The term "character", as used herein, refers to a symbol or sign used in writing like a grapheme, a logogram, an alphabetic letter, a typographical ligature, a numerical digit or a punctuation sign.

The terms "identification, identifier and ID", as used herein, refer to a one or several characters recognized in machine-readable code to obtain a searchable string of characters.

The term "position", as used herein with respect to a character position, refers to data which makes it possible to locate the character. For example, the position may be provided by the coordinates of the pixels of a bounding box that surrounds the character.

The expression "segmentation point" as used herein refers to the point at a boundary between characters. A segmentation point of a character may for example be provided by the leftmost black pixel of a bounding box of the character or by the leftmost black pixel of the character.

The expression "segmentation part", as used herein, refers to a part of an image of a string of characters that undergoes processes to determine if it represents a character, a group of characters, a pattern, . . . The leftmost point of a segmentation part is preferably a segmentation point.

The term "classification", as used herein, refers to the generation of at least one hypothesis on the identification of one or several characters. Each identification hypothesis, or ID hypothesis, is associated with a likelihood parameter.

The term "Optical Character Recognition (OCR)", as used herein, refers to any conversion to a text present in an image into machine-readable code. An OCR can be very complex and includes, for example, decision models, as well as it can be a pretty simple single-character classification.

The terms "candidates, hypotheses, ID hypotheses or identification hypotheses", as used herein, refer to alternative possible solutions for the identification of a character or group of characters. They are often related to a likelihood parameter.

The term "likelihood parameter" as used herein refer to a parameter which has a value that provides an indication of probability that the identification hypothesis, ID hypotheses, character candidate, etc. is correct, i.e., that the image or segmentation part that undergoes the classification indeed represents the character or group of characters of the identification hypothesis. A likelihood parameter can be for example a probability or a weight. Likelihood parameters coming from various OCRs can be on different scales, in which case, a conversion may be used to get them on the same scale and make them comparable.

The term "data structure", as used herein, refers to an entity comprising data.

The term "graph", as used herein, refers to a data structure comprising vertices and edges.

As used herein, the expression "connected component" in a black-and-white image is intended to refer to a group of black pixels that are connected to each other by black pixels.

FIG. 1 shows a flowchart of an OCR method 10 according to the invention.

An image 11 of a string of characters is taken as input by a first OCR 12. The image 11 of a string of characters is preferably a black-and-white digital image. The first OCR 12 processes the information contained in the image and provides, as outputs, first character candidates 13 with segmentation points 14 of the characters in the image and preferably weights 18 of the characters, the weights being likelihood parameters. The first character candidates 13 with the segmentation points 14 of the characters in the image may be a sequence of character candidates with the segmentation points 14 provided by the positions of the characters, possibly with related weights, or it may be a plurality of possible sequences of character candidates with the positions of the characters, possibly with related weights. The segmentation points 14 of the first character candidates 13 may be referred as first segmentation points 14. The plurality of segmentation points 14 may be considered as a list of segmentation points 14.

The first OCR may or may not use decision models.

The first character candidates 13, with their segmentation points 14 and weights 18, are used as input in a generation 15 of a first graph, which outputs a first graph 16. If necessary, the generation 15 of the first graph determines first segmentation points from the character candidate segmentation points 14. If necessary, the generation 15 of the first graph converts the weights 18 into first likelihood parameters to make them corresponds to another scale of likelihood parameters. In the first graph 16, the first segmentation points are represented as vertices, the first character candidates are represented as edges and the first likelihood parameters of the first character candidates are represented as edge values of corresponding edges.

A graph typically starts with a first vertex, which corresponds to an initial segmentation point, which is the segmentation point the most on the left on the image of the string of characters 11. The first vertex is linked to another vertex, which corresponds to another segmentation point, by an edge corresponding to the character identified between the initial and the other segmentation points. The graph continues with a vertex for each segmentation point and an edge for each character between the segmentation points. The likelihood parameters of the characters are represented by edge values at the corresponding edges. The graph ends with a vertex corresponding to a point at the right of the last character in the image of the string of characters 11. This point at the right of the last character in the image of the string of characters 11 is preferably not a segmentation point.

Other types of data structures than a graph may be used to order the outputs of the OCR without departing from the scope of the invention.

Figure 2:
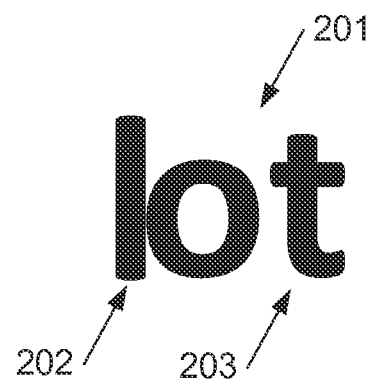
FIG. 2 illustrates an example of an image of a string of characters with segmentation points.

FIG. 2 illustrates of an image of a string of characters 11. In this example 201, the first OCR 12 has identified a b starting at a segmentation point 202 with a likelihood parameter of 80% and a t starting at a segmentation point 203 with a likelihood parameter of 95%.

Figure 3:
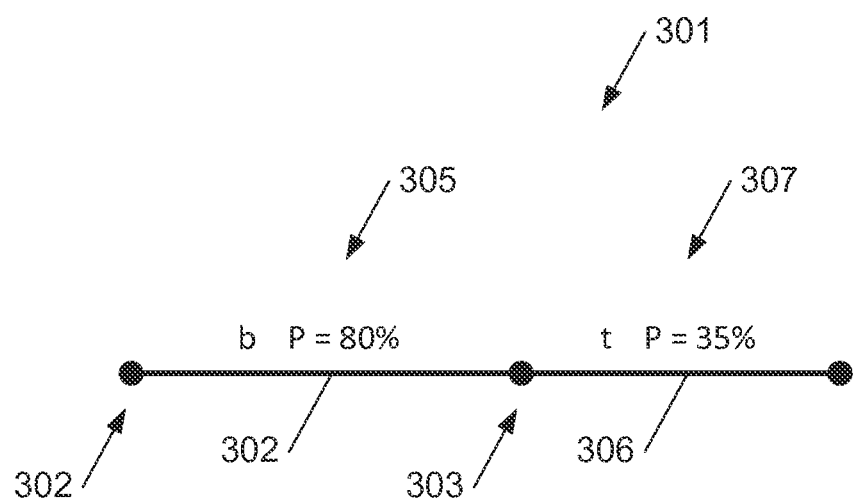
FIG. 3 illustrates an example of a graph corresponding to the image and the segmentation points of FIG. 2.

FIG. 3 illustrates the first graph 301 generated at step 15 from the output 13 of the first OCR 12. Vertex 302 corresponds to segmentation point 202. Edge 304 corresponds to letter b, and the associated parameter of 80% 305 is also included in the first graph 301. Vertex 303 corresponds to segmentation point 203. Edge 306 corresponds to letter t, and the associated parameter of 95% 307 is also included in the first graph 301.

Referring now to FIG. 1, the first segmentation point 14 and the image of string of characters 11 are used as input for a combined segmentation and classification 100. In an embodiment of the invention wherein the positions are outputted by the first OCR 12 instead of the first segmentation points 14, the first segmentation points 14 are determined at another step of the method 10, for example during the combined segmentation and classification 100. For example, if the first OCR 12 outputs the bounding boxes of the first characters, the segmentation points can be determined as the points of the leftmost black pixel in each bounding box.

The combined segmentation and classification 100 is a second OCR and will be described later referring to FIG. 4. The combined segmentation and classification 100 generates, preferably at least once for each character in the image of the string of character 11, at least one second character candidate with its position and preferably a probability of the second character candidate 17. The segmentation point 121 that has provided the ID hypothesis 127*a* that was selected as second character candidate 17 may be used instead of, or on top of, the position of the second character candidate 17. This segmentation point 121 may be called second segmentation point. The probability of the second character candidate is a second likelihood parameter.

In an embodiment of the invention, there can be one or several second character candidates each having its corresponding position and preferably each having its probability determined by the combined segmentation and classification 100 for each character in the image of the string of characters 11.

The second character candidate, its position and its probability 17 are, every time they are generated, used as input for an update 20 of the graph that updates the first graph 16. At the end of the combined segmentation and classification 100, the global output of the updates 20 of the graph is a second graph 21 which combines the output of the first OCR 12 and the output of the combined segmentation and classification 100. If necessary, the update 20 of the graph converts the probabilities into second likelihood parameters having the same scale as the first likelihood parameters to make them comparable. The update 20 of the graph adds a new edge for each second ID. The update 20 of the graph adds a new vertex at the end of each new edge that does not end on a vertex already present in the graph.

Figure 7:
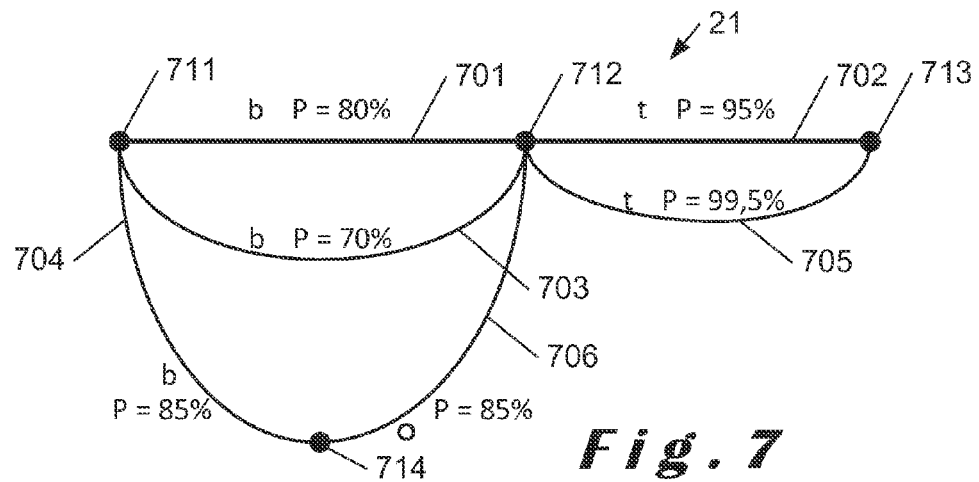
FIG. 7 illustrates a graph at the end of the combined segmentation and classification illustrated at FIG. 6.

The second graph 21 includes an edge for each of the first IDs and for each of the second IDs, associated with their respective likelihood parameter, and a vertex for each of the first segmentation points and for each of the second segmentation points. An example of second graph is illustrated at FIG. 7 and will be described later. Edges and/or vertices in the second graph 21 may have a label that indicates if they have been generated from the first OCR or from the combined segmentation and classification 100.

The second graph 21 is then used as input in an optional step of adding decision models 22, which generates a third decision graph 23. Step 22 may add the decision models to the graph by use of a weighted finite state transducer (WFST) based algorithm. This step 22 is actually an application of a decision model method. The addition of decision models 22 modifies the likelihood parameters of edges, i.e.

characters, or group of edges, i.e. groups of characters, in order to favour those that are a priori the most probable, for example in view of the context. Decision models modify the weights of paths. Decision models are preferably related to contextual decision. Decision models strongly improve identification accuracy.

The decision models may involve bigrams, typographical metrics, lists of words like dictionaries, character n-grams, punctuation rules and spacing rules.

A first kind of decision model is a linguistic model. If the word "ornate" is present in the image of string of character to be identified, the first or the second OCR can for example find the word "ornate" and the word "ornate" as IDs with similar likelihood parameters because the letters rn taken together look like the letter m. A linguistic model using a dictionary is able to detect that the word "ornate" does not exist, while the word "ornate" does.

In an embodiment of the present invention, the linguistic model uses an n-gram model. If the word "TRESMEUR" is present in the image of string of character 11, the first or the second OCR can for example find the word "TRE5MEUR" and the word "TRESMEUR" as IDs with similar likelihood parameters because the letters 'S' may look like the letter '5' in a printed text. A linguistic model using a bigram (n-gram with n=2) model would prefer "TRESMEUR" if "ES" and "SM" have better probabilities of occurrence than "E5" and "5M".

Another kind of model used in an embodiment of the present invention is a typographical model. If the word "Loguivy" is present in the image of string of character 11, the first or the second OCR can for example find the word "Loguivy" and the word "Loguivv" as IDs with similar likelihood parameters because the letters 'y' may look like the letter 'v' in a printed text. A typographic model using font metrics would prefer "Loguivy" because the position of the bottom of the final character corresponds more likely to the bottom position of a 'y' (in his model) than a 'v'.

In an embodiment of the present invention, the typographical model considers the position of the character in the image to check if sizes and positions are expected or not.

In a decision model involving punctuation and spacing rules, some combinations of punctuation and/or spaces are disfavoured.

In an embodiment of the invention, a decision model is added at step 22 that favours IDs that have the first likelihood parameter and the second likelihood parameter fulfilling a predetermined criterion. Indeed, it is expected that, if a same ID is found by the first OCR 12 and the combined segmentation and classification 100, the ID is more trustable. Therefore, if for an ID, both the first likelihood parameter and the second likelihood parameter are above a threshold of, for example, 90%, the ID can be favoured.

In an embodiment of the invention, a decision model is added at step 22 that is equivalent to an OCR voting because it favours the first OCR in some cases and the second OCR in other cases. For example, if the first OCR is known to be extremely accurate for a first type of characters, like katakana characters, while the combined segmentation and classification 100 is known to be extremely accurate for a second type of characters, like kanji, a decision model may be added that favours IDs corresponding to the first type of characters (katakana) if these IDs have been determined by the first OCR and favours IDs corresponding to the second type of characters (kanji) if these IDs have been determined by the combined segmentation and classification 100.

A step of determination of best path 24 is then performed on the third graph 23 to determine the IDs 25 of the characters present in the image 11 of the string of characters. The determination of best path 24 determines, amongst the possible paths defined by the edges joined by vertices in the third graph 23, and taking into account the likelihood parameters associated with the edges, the path, i.e. the sequence of IDs, with the highest probability to correspond to the image 11 of the string of characters. The determination of best path 24 may use a weighted finite state transducer (WFST) based decision algorithm that optimizes a path weight to find the best solution.

Figure 4:
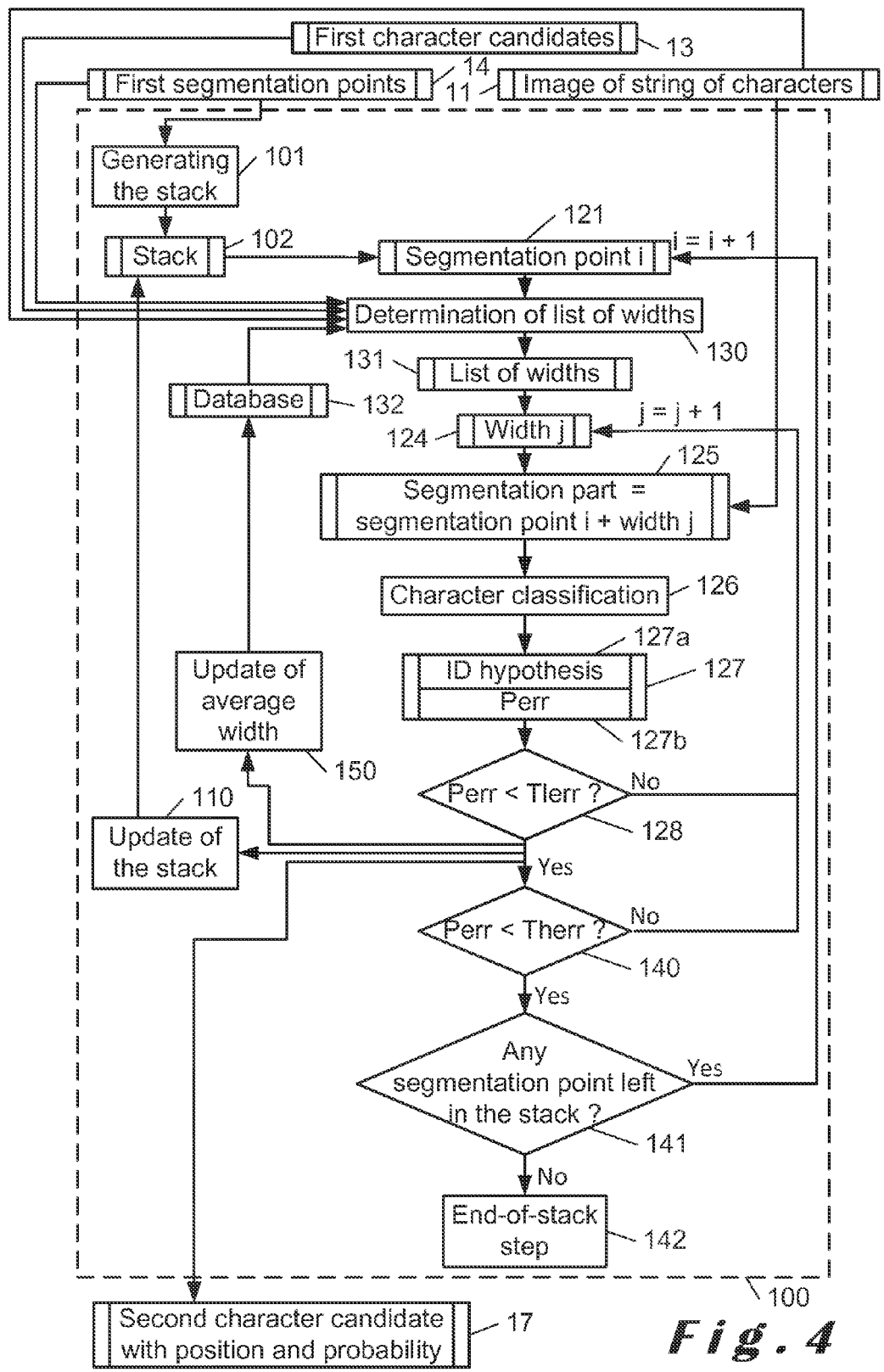
FIG. 4 illustrates a flowchart of combined segmentation and classification according to an embodiment of the invention.

FIG. 4 illustrates a flow chart for the combined segmentation and classification 100 according to an embodiment of the invention.

This flow chart includes a stack 102, which is a list of segmentation points or a data structure comprising segmentation points. The first segmentation points 14 are used as input by a step 101 of creating the stack. During this step 101, the initial data of the stack are determined. The first character candidates 13 might also be used by step 101. Preferably, before this step 101, the stack 102 does not exist or is empty. In an embodiment of the invention, during this step 101, the first segmentation points 14 are placed into the stack 102.

The combined segmentation and classification 100 starts iterating on the segmentation points of the stack with a segmentation point index i set equal to a first value, for example 1. A corresponding segmentation point 121, coming from the stack 102, is considered. The first time that a segmentation point 121 is considered in the combined segmentation and classification 100, the segmentation point 121 is preferably one of the first segmentation points 14 that was determined by the first OCR. The segmentation point 121 is preferably removed from the stack 102, in such a way that the stack 102 contains only segmentation points that still have to be considered. The segmentation point 121 is preferably placed in a list of segmentation points already processed.

Then, the combined segmentation and classification 100 determines, at step 130, a list of widths 131. Preferably, this determination 130 does not use as input a list of widths determined for another segmentation point. In an embodiment of the invention, the list 131 of widths is generated at step 130 as described in U.S. patent application Ser. No. 14/254,096 which is incorporated in the current application by reference, wherein the first segmentation points 14 are used as input. The image of string of character 11 and/or the first character candidates may also be used as inputs. In an embodiment of the invention, the determination 130 uses a database 132 storing reference character widths, storing an average width and possibly storing other character statistics. The determination 130 is preferably based on this average width provided by the database 132 and size(s) of connected component(s) around the segmentation point i, the size(s) being provided by the image 11 of string of characters. The determination 130 is more preferably based on this average width provided by the database 132 and the size(s) of connected component(s) following the segmentation point i, the size(s) being provided by the image 11 of string of characters.

In an embodiment of the invention, the determination 130 estimates, from the first segmentation points 14, from size(s) of connected component(s) around the segmentation point 121, and from the database 132, the width for the character following the segmentation point 121.

The list 131 of widths is preferably ordered from most likely to less likely character width, as described in the U.S. patent application Ser. No. 14/254,096.

Then, the combined segmentation and classification 100 starts iterating on the widths of the list of widths 131, with a width index j set equal to a first value, for example 1. A width 124, coming from the list of widths 131, is considered. The combination of the segmentation point i and the width j provides a segmentation part 125, which is a portion of the image of string of characters 11. A character classification 126 is performed on the segmentation part 125. The character classification 126 is preferably a single-character classification. The character classification 126 can include a character classification designed for a first type of character, for example Asian characters, and a character classification designed for a second type of character, for example Latin characters. Such a character classification is described in the U.S. patent application Ser. No. 14/299,205 which is incorporated here by reference.

The character classification 126 provides an ID hypothesis 127a with likelihood of error $P_{err}$ 127b. The ID hypothesis 127a is an hypothesis about the character possibly present on the segmentation part 125. The likelihood of error $P_{err}$ 127b is a likelihood parameter. The likelihood of error $P_{err}$ 127b is a percentage that decreases with the probability that the classification 126 has correctly identified the content of the segmentation part 125. The probability that the classification 126 has correctly identified the content of the segmentation part 125 is equal to $1-P_{err}$. $P_{err}$ and the probability equal to $1-P_{err}$ may both be called "second likelihood parameter" since they both provide an indication of probability that the identification hypothesis 127a is correct for the character classification 126.

The combined segmentation-classification 100 checks then, at step 128, if the likelihood of error $P_{err}$ fulfills a first predetermined criterion, which is that $P_{err}$ is smaller than a threshold to have a high likelihood of error $Th_{err}$. $Th_{err}$ is preferably chosen close to 100%, for example equal to 99.9%. Like that, the first predetermined criterion discards hypotheses that are really unlikely. If the first predetermined criterion is not fulfilled, the index j is incremented and a next width, coming from the list of widths 131, is considered.

If the first predetermined criterion is fulfilled, it indicates that the ID hypothesis might have a chance to be right. If the first predetermined criterion is fulfilled, an update 110 of the stack is performed. This update 110 of the stack is described below, referring to FIG. 5.

If the first predetermined criterion is fulfilled, an update 150 of the average list is performed and the updated average width replaces the average width in the database 132. In an embodiment of the invention, the update 150 of the average width is performed as described in U.S. patent application Ser. No. 14/254,096 which is incorporated here by reference.

In an embodiment of the invention, the update 150 of the average width is followed by the determination 130 of the list of widths, which generates the list of widths 131 to be used for the same segmentation point i in the next iteration about the widths, by the combined segmentation and classification 100.

If the first predetermined criterion is fulfilled, the second character candidate, its position and its probability 17 are added in the graph during the corresponding update 20 of the graph (FIG. 1). The second character candidate, its position and its probability 17 may not be outputted as such by the combined segmentation and classification 100, but just added in the graph. The second character candidate is equal to the ID hypothesis 127a. In other words, the ID hypothesis is selected as the second character candidate. The position of the second character candidate is provided by the segmentation part where the second character candidate was identified, i.e., by the segmentation point i and the width j that were considered. The probability of the second character candidate is equal to $1-P_{err}$, with the value of $P_{err}$ of 127b.

The update of the graph 20 (FIG. 1) is preferably performed immediately after the selection of the ID hypothesis 127 as the second character candidate by step 128. In other words, the update of the graph 20 is preferably performed for each segmentation part 125 that provides and ID hypothesis 127a that has a likelihood parameter 127b that satisfies the first predetermined criterion 128.

The character classification 126 may provide a plurality of ID hypotheses 127a, each with their respective likelihood of error $P_{err}$ 127b, all corresponding to the same segmentation part 125. In such a case, checks 128 and 140 are performed on the ID hypothesis with the lowest $P_{err}$, i.e., the ID hypothesis that is the most expected to be right. The "second character candidate with position and probability" 17 of the figures includes then the plurality of ID hypotheses, with each their respective position and probability. They are all included 20 in the graph at once, before moving to a next segmentation part 125.

In the combined segmentation and classification 100, any segmentation part 125 is considered only once.

The first predetermined criterion provides a tunable parameter to determine the threshold of probability from which the ID hypothesis 127a are added into the graph. A very high $Th_{err}$ provides a very large second graph 21, which gives a high accuracy but might slow down the OCR method 10. A lower $Th_{err}$ provides a smaller second graph 21, which might give a lower accuracy but speeds up the OCR method 10.

In an embodiment of the invention, different criteria might be used to determine whether the second character candidate, its position and its probability 17 are used in an update 20 of the graph, whether the update 110 of the stack is performed, whether the update 150 of the list of widths is performed and/or whether another width (j=j+1) is considered.

If the first predetermined criterion is fulfilled, the combined segmentation-classification 100 checks, at step 140, if the likelihood of error $P_{err}$ fulfills a second predetermined criterion, which is that $P_{err}$ is smaller than a threshold to have a low likelihood of error $Tl_{err}$. $Tl_{err}$ is preferably chosen between 5% and 50%, for example equal to 20%. Like that, the second predetermined criterion is fulfilled only in cases where the ID hypothesis is really likely. If the second predetermined criterion is not fulfilled, the index j is incremented and a next width, coming from the list of widths 131, is considered. If the second predetermined criterion is fulfilled, the combined segmentation-classification 100 checks, at step 141, if the stack 102 still contains at least one segmentation point.

If the stack 102 still contains at least one segmentation point, the index i of segmentation points is incremented and a next segmentation point 121 is considered.

If the stack 102 contains no more segmentation point, the combined segmentation-classification 100 preferably performs an end-of-stack step 142. The end-of-stack step 142 comprises a verification that the end of the image of the string of characters 11 has been reached, for example by checking that the ID of the character located the rightmost in the second graph 21 includes the rightmost black pixel of the image of the string of characters 11.

If the end of the image of the string of characters 11 has not been reached, an empty character with a probability equal to 0 is inserted in the graph starting at the vertex corresponding to the rightmost segmentation point that has been considered, a segmentation point corresponding to the end of this empty character is placed in the stack 102 and the combined segmentation and classification 100 resumes with this segmentation point.

If the end of the image of the string of characters 11 has been reached, an empty character with probability equal to 0 may be added in the second graph 21 between each vertex that is not connected to a next vertex (each segmentation point for which no second character candidate 17 has been selected) and the next vertex.

Figure 5:
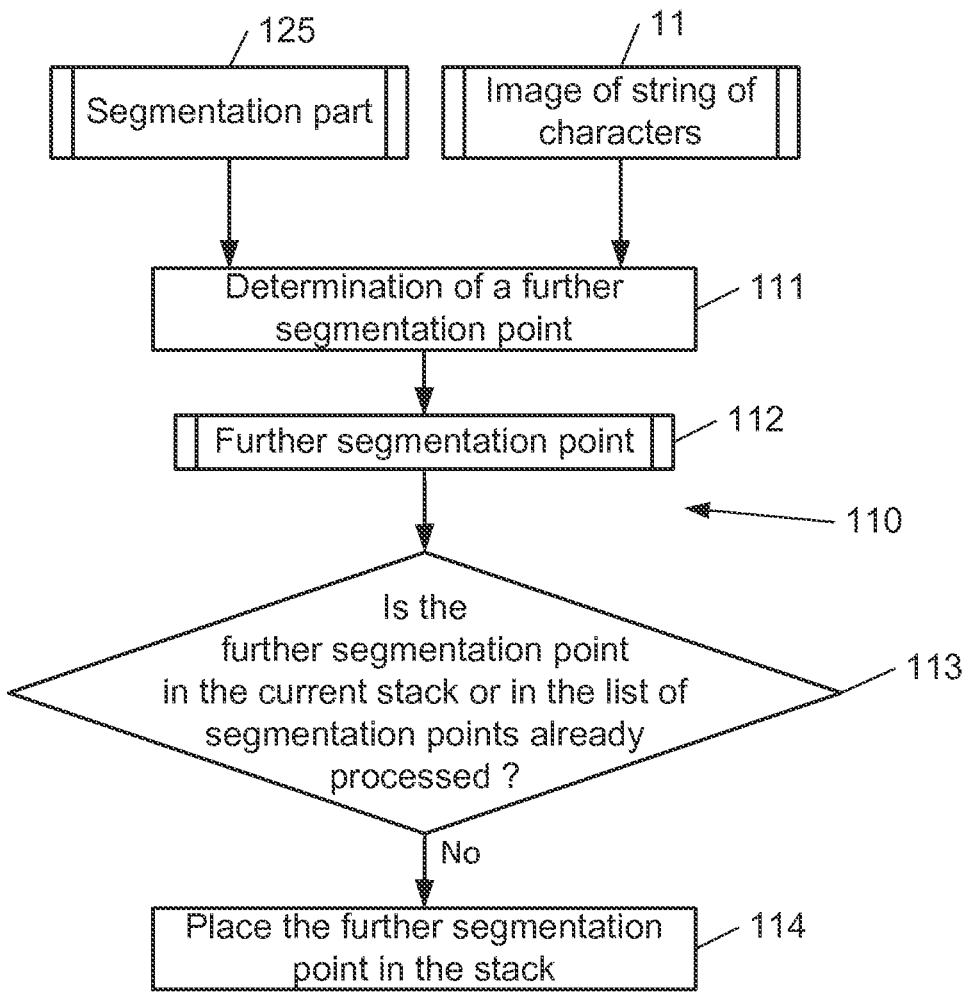
FIG. 5 illustrates an update of a list of segmentation points according to an embodiment of the invention.

FIG. 5 shows the update 110 of the stack according to an embodiment of the invention. When performed, the update 110 of the stack takes as inputs the segmentation part 125 considered at that moment in the combined segmentation and classification 100 and the image of string of characters 11. The update 110 of the stack includes a determination 111 of a further segmentation point. This further segmentation point 112 is expected to correspond to the beginning of a character at the right of the character that has just been identified in the segmentation part 125 by the character classification 126. The further segmentation point 112 is preferably determined as the leftmost black pixel at the right of the segmentation part 125. The inter-character space can have a predetermined value or be calculated during the combined segmentation and classification 100.

Alternatively, the further segmentation point 112 may be calculated, for example during the character classification 126, and provided to the update 110 of the stack.

In an embodiment of the invention, the determination 111 of a further segmentation point uses information coming from the database 132.

The update 110 of the stack then checks, at step 113, if the further segmentation point 112 is currently present in the stack 102 or in the list of segmentation points already processed. If not, the further segmentation point 112 is placed in the stack 102.

Since a character is expected to start a bit after the previous character, this update 110 of the stack generates segmentation points that are probable starting points for a next character. The check at step 113 avoids that a segmentation point appears twice in the stack 102.

FIG. 6 illustrates a very simple example of the combined segmentation and classification 100 according to the invention. FIG. 7 illustrates the second graph 21 at the end of the combined segmentation and classification 100 illustrated at FIG. 6.

Figure 6A:
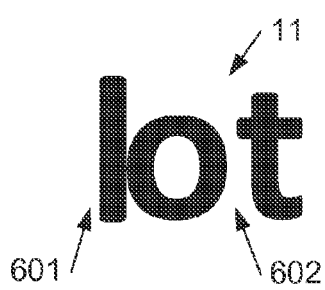
FIGS. 6a-6e illustrate a very simple example of the combined segmentation and classification according to the invention.

FIG. 6a shows an image of string of characters 11 with the word lot and wherein the letters l and o are so close that it is difficult to determine if there are l and o, or b. The first OCR 12 has provided the IDs b and t with their position and their probability (P=80% for b and P=95% for t). From their position, segmentation points 601 and 602 can be determined (FIG. 6a). The graph, which is the first graph at that stage, comprises the vertices 711, 712 and 713 and the edges 701 and 702 (FIG. 7).

The stack contains the segmentation points 601 and 602. For the segmentation point 601, the determination 130 of the list of widths determines possible widths including a width 603. The width 603 is placed in the list 131 of widths.

Figure 6B:
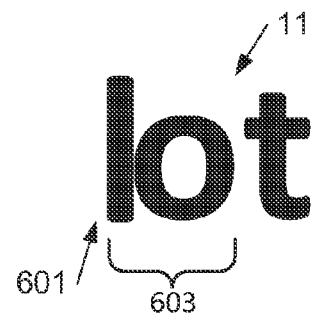

FIG. 6b shows the width 603 that is considered first together with the segmentation point 601 in the classification 126. The classification 126 finds that the segmentation part provided by the segmentation point 601 and the width 603 represents a b with a probability of 70%. Since $P_{err}$ (30%) is lower than $Th_{err}$ (99.9%), a corresponding edge 703 is added in the graph 21 during an update 20 of the graph. The update 110 of the stack determines the further segmentation point (step 111). It is found at step 112 that this further segmentation point which corresponds to the point 602 is already in the stack 102. Therefore, this further segmentation point is not added in the stack 102. The update 150 of the average width is performed, which updates the database 132. The determination 130 of the list of widths is also performed to take into account the update in the database. Since $P_{err}$ (30%) is not lower than $Tl_{err}$ (20%), another width 604 from the list 131 is tried.

Figure 6C:
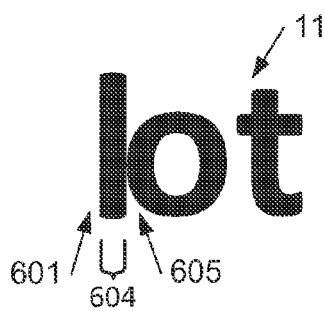

FIG. 6c shows the width 604, which is considered together with the segmentation point 601 in the classification 126. The classification 126 finds that the segmentation part provided by the segmentation point 601 and the width 604 represents a l with a probability of 85%. Since $P_{err}$ (15%) is lower than $Th_{err}$ (99.9%), a corresponding edge 704 is added in the graph 21 during an update 20 of the graph and a vertex 714, which corresponds to a segmentation point 605 at the end of the l, is added in the graph 21.

A further segmentation point 605 is then determined at step 111 of the update 110 of the stack. Since the point 605 is not in the stack (step 113), it is added to the stack. The update 150 of the average width and the determination 130 of the list of widths are also performed.

Since $P_{err}$ (15%) is lower than $Tl_{err}$ (20%), there is a check (step 141) to verify if there is any segmentation point left in the stack 102. The segmentation points 602 and 605 being still in the stack 102, the next segmentation point, 602, is considered.

Figure 6D:
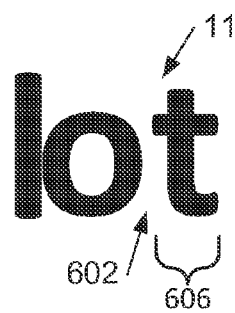

FIG. 6d shows the segmentation point 602 considered together with a width 606 in the classification 126. The classification 126 finds that the segmentation part provided by the segmentation point 602 and the width 606 represents a t with a probability of 99.5%. Since $P_{err}$ (0.5%) is lower than $Th_{err}$ (99.9%), a corresponding edge 705 is added in the graph 21 during an update 20 of the graph. The update 110 of the stack is not performed because the end of the string of characters has been reached. The update 150 of the average width and the determination 130 of the list of widths are performed.

Since $P_{err}$ (0.5%) is lower than $Tl_{err}$ (20%), there is a check (step 141) to verify if there is any segmentation point left in the stack 102. The segmentation 605 being still in the stack 102, this segmentation point, 605, is considered.

Figure 6E:
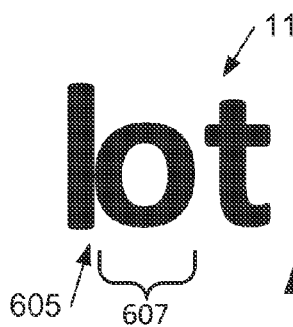

FIG. 6e shows the segmentation point 605 considered together with a width 607 in the classification 126. The classification 126 finds that the segmentation part provided by the segmentation point 605 and the width 607 represents a o with a probability of 85%. Since $P_{err}$ (15%) is lower than $Th_{err}$ (99.9%), a corresponding edge 706 is added in the graph 21 during an update 20 of the graph. The update 110 of the stack determines the further segmentation point (step 111). It is found at step 112 that this further segmentation point which corresponds to the point 602 is in the list of segmentation points that have already been processed. Therefore, this further segmentation point is not added in the stack 102. The update 150 of the average width and the determination 130 of the list of widths are also performed.

Since $P_{err}$ (15%) is lower than $Tl_{err}$ (20%), there is a check (step 141) to verify if there is any segmentation point left in the stack 102. Since the stack 102 is empty, the combined segmentation and classification 100 moves to the end-of-stack steps 142.

The end-of-stack steps verifies that the rightmost pixel of the image of the string of characters 11 is indeed part of the t. All vertices in the graph 21 are connected to a next vertex and therefore no empty character is added in the graph 21.

Decision models can then be added to the second graph shown at FIG. 7. The decision models may modify the probabilities indicated in the graph. A contextual decision model based on an English dictionary can for example strongly favors the string of characters "lot" with respect to the string of characters "bt".

The present invention includes a combination of a first OCR 12 and a second OCR, which is the combined segmentation and classification 100, at several stages: at the input of the first segmentation points 14 in the stack 102 of the second OCR 100, at the update 20 of the graph generated from the first OCR 12 that generates the second graph 21, and in the decision models 22.

The invention does not require to have insight about the way the first OCR 12 is performed. It only requires to obtain from the first OCR 12 the sequence of character IDs, their position in the image of the string of characters, and if possible their likelihood parameters, which are the usual outputs of any OCR. Therefore, the invention is able to combine almost any commercial OCR with the second OCR.

Moreover, the invention takes the best of both OCRs in such a way that the output of the OCR method 10 according to the invention is better than the output of the first OCR 12 and better than the output of the second OCR 100.

If, furthermore, the first OCR 12 is very fast, the computation time taken by the OCR method 10 according to the invention is hardly higher than the computation time taken by the second OCR 100 followed by decision models.

Altogether, in the OCR method according to the invention, two segmentations are performed. A first segmentation is performed during the first OCR 12. A second segmentation, based on segmentation points and widths and which is combined with the classification as described with reference to FIG. 4, is performed during the second OCR 100. The second segmentation uses the segmentation points found by the first segmentation as input.

According to an embodiment of the invention, at least one additional OCR is performed after the second OCR. The at least one additional OCR uses the segmentation points provided by one or more OCRs previously performed and outputs IDs of character with their positions and likelihood parameters that are used to update the graph before the addition of decision models 22.

According to an embodiment of the invention, at least part of the method according to the invention may be executed by a computer.

In other words, the invention relates to a method and a program for combining a first Optical Character Recognition (OCR) 12 and a second OCR 100. The first OCR 12 is run first on an image of a string of characters 11. Its output 13 (first identified characters, positions of the characters and likelihood parameters of the characters) is used to generate a first graph 16. Segmentation points related to the positions of the first identified characters 14 are used as input by the second OCR 100 performing a combined segmentation and classification on the image of string of characters 11. The output 17 (second identified characters, positions of the characters and likelihood parameters of the characters) of the second OCR 100 is used to update 20 the first graph 16, to generate a second graph 21 that combines the output 13 of the first OCR 12 with the output 17 of the second OCR 100. Decision models are then used to modify 22 the weights of paths in the second graph 21 to generate a third graph 23. A best path is determined 24 on the third graph 23 to obtain the identification 25 of the characters present in the image of string of characters 11.

The invention claimed is:

1. A method for selecting character candidates in a method for identifying characters in a digital image, the method comprising the steps of:
   a) applying a first character identification process to determine first character candidates and a list of segmentation points of the first character candidates,
   b) generating a list of character widths corresponding to a segmentation point from the list of segmentation points,
   c) determining a portion of the digital image corresponding to the segmentation point and a character width from the list of character widths,
   d) applying a character classification method on the portion of the digital image to obtain an ID hypothesis of a character possibly present in the portion of the digital image and a likelihood parameter that relates to a likelihood that the ID hypothesis is correct, and
   e) selecting the ID hypothesis as a second character candidate in the digital image if the likelihood parameter fulfils a first predetermined criterion.

2. A method according to claim 1, the method further comprising step f) of updating the list of segmentation points with a further segmentation point determined based on the portion of the digital image corresponding to the selected second character candidate.

3. A method according to claim 2, wherein step f) comprises
   checking whether the further segmentation point is already in the list of segmentation points, and
   adding the further segmentation point in the list of segmentation points if the further segmentation point is not already present in the list of segmentation point.

4. A method according to claim 1, wherein at step b) the list of character widths is generated based on at least the list of segmentation points of the first character candidates.

5. A method according to claim 1, wherein steps b, c, d and e are performed for each segmentation point of the list of segmentation points.

6. A method according to claim 1, wherein steps c, d and e are repeated for another character width of the list of character widths if the likelihood parameter does not fulfil the first predetermined criterion.

7. A method according to claim 1, wherein steps c, d and e are repeated for another character width of the list of character widths if the likelihood parameter fulfils the first predetermined criterion and does not fulfil a second predetermined criterion.

8. A method according to claim 1, wherein the method further comprises the steps of:
   f) generating a data structure from the first character candidates and the list of segmentation points, and
   g) updating the data structure with the selected second character candidate and a further segmentation point calculated from the character width of the selected second character candidate and the segmentation point used for determining the portion of the digital image corresponding to the selected second character candidate.

9. A method according to claim 8, wherein step a) comprises determining first likelihood parameters of the first character candidates providing an indication of the chance that the candidate character is correct, wherein the data structure includes the first likelihood parameters of the first character candidates, and wherein the method further comprises the steps of:

changing the scale of the first likelihood parameters of the first character candidates and/or the likelihood parameters of the second character candidates to make them comparable to each other, and updating the data structure with the likelihood parameters of the second character candidates.

10. A method according to claim 9, wherein the data structure is a graph in which segmentation points are represented by vertices and character candidates are represented by edges between vertices.

11. A method according to claim 10, further comprising the step of applying a decision model method on the updated data structure.

12. A method according to claim 11, further comprising the steps of determining a best path in the updated data structure, and selecting the first and second character candidates corresponding to the edges in the best path as the characters in the digital image.

13. A method according to claim 12, wherein the step of applying a decision model method comprises favouring character candidates which have the first likelihood parameters of first character candidates and the second likelihood parameters of second character candidates fulfilling a third predetermined criterion.

14. A method according to claim 13, wherein some of the first and second character candidates are characters of a first or second type, and wherein the decision model method comprises favouring character candidates of the first type if the character candidates are provided by the first character identification process and favouring character candidates of the second type if the character candidates are provided by the classification method.

15. A method according to claim 1, wherein the first character identification process comprises a decision model method.

16. A method according to claim 1, wherein the first character identification process provides positions of first character candidates and further comprising a step of determining the list of segmentation points of the first character candidates from the positions of the first character candidates.

17. A method for identifying characters in a digital image, the method comprising the steps of:

a) applying a first character identification method to determine first character candidates and first segmentation points corresponding to the first character candidates, b) generating a first graph based on the first character candidates and the first segmentation points, wherein the first segmentation points are represented by vertices and the first character candidates by edges, c) applying a second character identification method on at least part of the digital image to generate at least one second character candidate, d) updating the graph by adding the at least one second character candidate to the first graph, and e) selecting in the updated graph character candidates as the characters of the digital image.

18. Method according to claim 17, wherein the second character identification method generates at least one second segmentation point and wherein the at least one second segmentation point is added to the graph at step d).

19. Method according to claim 18, wherein the first character identification method provides first likelihood parameters providing a likelihood that the first character candidates are correct, wherein the second character identification method provides second likelihood parameters providing a likelihood that the at least one second character candidate is correct, and wherein the method further comprises the steps of:

changing the scale of the first likelihood parameters and/or the second likelihood parameters to make them comparable to each other, adding the first likelihood parameters in the first graph, and adding the second likelihood parameters in the updated graph.

20. Method according to claim 19, further comprising the step of applying a decision model method on the updated graph.

21. A method according to claim 20, wherein the decision model method comprises a rule which favours character candidates which have the first likelihood parameter and the second likelihood parameters fulfilling a third predetermined criterion.

22. A method according to claim 21, wherein the first character identification method provides character candidates for characters of a first type, wherein the second character identification method provides character candidates for characters of a second type, and wherein the decision model method comprises a rule which favours character candidates corresponding to the first type of characters if these character candidates have been determined by the first character identification method and favours character candidates corresponding to the second type of characters if these character candidates have been determined by the second character identification method.

23. A method according to claim 17, wherein the second character identification method uses as input, at step c), the first segmentation points from the first character identification method.

24. A non-transitory computer readable medium storing a program causing a computer to execute a method for identifying characters in a digital image, the method comprising the steps of:

a) applying a first character identification process to determine first character candidates and a list of segmentation points of the first character candidates, b) generating a list of character widths corresponding to a segmentation point from the list of segmentation points, c) determining a portion of the digital image corresponding to the segmentation point from the list of segmentation points and a character width from the list of character widths, d) applying a character classification method on the portion of the digital image to obtain an ID hypothesis of a character possibly present in the portion of the digital image and a likelihood parameter that relates to a likelihood that the ID hypothesis is correct, and e) selecting the ID hypothesis as a second character candidate in the digital image if the likelihood parameter fulfils a first predetermined criterion.

* * * * *